(12) United States Patent
Brown et al.

(10) Patent No.: US 8,571,754 B2
(45) Date of Patent: *Oct. 29, 2013

(54) SECURABLE COVER FOR VEHICLE LIGHTS AND METHOD

(75) Inventors: Alyn Brown, Indianapolis, IN (US); James Wiff, Cologne, MN (US)

(73) Assignee: Control Solutions LLC, Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/471,578

(22) Filed: May 15, 2012

(65) Prior Publication Data

US 2012/0243069 A1   Sep. 27, 2012

Related U.S. Application Data

(63) Continuation of application No. 12/512,881, filed on Jul. 30, 2009, now Pat. No. 8,200,390.

(51) Int. Cl.
```
G02F 1/15    (2006.01)
B60Q 1/14    (2006.01)
F21S 8/10    (2006.01)
F21V 1/16    (2006.01)
F21V 9/08    (2006.01)
```

(52) U.S. Cl.
CPC ......... *F21S 48/1731* (2013.01); *G02F 2203/66* (2013.01); *F21S 8/10* (2013.01); *B60Q 1/14* (2013.01); *G02F 1/15* (2013.01); *F21V 1/16* (2013.01); *F21V 9/08* (2013.01); *G02F 2203/64* (2013.01)
USPC .............................. 701/36; 359/265; 362/509

(58) Field of Classification Search
CPC .................................................... F21V 48/1731
USPC .......................................................... 362/509
See application file for complete search history.

(56) References Cited

U.S. PATENT DOCUMENTS 8,200,390 B2 * 6/2012 Brown et al. .................... 701/36
8,256,940 B2 * 9/2012 Brown et al. .................. 362/509

* cited by examiner

*Primary Examiner* — Mark Hellner
*Assistant Examiner* — Ari M Diacou
(74) *Attorney, Agent, or Firm* — McCracken & Frank LLC

(57) ABSTRACT

A cover for use in connection with one or more vehicle lights is provided. A lens of the cover contains an electrically activatable material that prevents the transmission of visible light from entering into and reflecting out from the one or more vehicle lights when the electrically activatable material is set to a light inhibiting state. A device holds the lens with the device configured to be releasably or removably secured over one or more vehicle lights. The electrically activatable material of the lens is configured to get to the light inhibiting state such that the lens prevents the transmission of visible light from entering into and reflecting out from the one or more vehicle lights to reduce the observability of the one or more vehicle lights.

21 Claims, 6 Drawing Sheets

SECURABLE COVER FOR VEHICLE LIGHTS AND METHOD

PRIORITY CLAIM AND CROSS REFERENCE TO RELATED APPLICATIONS AND METHOD

This application claims priority to parent application Ser. No. 12/512,881, titled "SECURABLE COVER FOR VEHICLE LIGHTS," by Alyn Brown and James Wiff filed on Jul. 30, 2009 and is incorporated by reference herein.

FIELD OF THE INVENTION

This invention relates to a cover that is releasably securable to lights of a vehicle such as the front or rear lights on a military or a security vehicle. In particular, the invention relates to a releasably securable cover that is adapted to block out the reflectivity of the lights on a vehicle such as a security vehicle or military combat vehicle.

BACKGROUND

Conventional lighting for military ground vehicles often utilize OEM lights or an accessory light bar having several high intensity discharge (HID) and/or infrared (IR) lights in a hardwired configuration permanently attached to the vehicle. The lights are generally fixed in position at the time of installation and are hardwired into the vehicle power and switching.

The observability of the vehicle due to reflections off the vehicle lights during certain field operations may be undesirable. For instance, if a military vehicle light is not turned on and the vehicle is in an open position, detection of the vehicle may occur because of light reflecting off reflectors behind light bulbs of the vehicle light module.

To address this, certain conventional vehicle systems may use mechanical covers which are physically installed on the lights to reduce the reflectivity of light reflectors when the lights are not being used. Both types of covers are installed manually which can be time consuming. These covers must also be repeatedly installed or removed depending on the mission. Additionally, coverings such as duct tape have been placed over the lights, at certain times, in an effort to reduce light reflectivity.

Accordingly, there is a need for a cover for vehicle lights, such as security or military combat vehicle lights that is adapted to block the reflectivity from light modules on security or military vehicles in a convenient manner.

SUMMARY

A cover for use in connection with one or more vehicle lights is provided. A lens of the cover contains an electrically activatable material that prevents the transmission of visible light from entering into and reflecting out from the one or more vehicle lights when the electrically activatable material is set to a light inhibiting state. A device holds the lens with the device configured to be releasably or removably secured over one or more vehicle lights. The electrically activatable material of the lens is configured to get to the light inhibiting state such that the lens prevents the transmission of visible light from entering into and reflecting out from the one or more vehicle lights to reduce the observability of the one or more vehicle lights.

A method of utilizing a cover in connection with one or more vehicle lights is also provided. A device holding a lens having an electrically activatable material is releasably secured over the one or more vehicle lights. The electrically activatable material prevents the transmission of visible light from entering into and reflecting out from the one or more vehicle lights when the electrically activatable material is set to a light inhibiting state. The electrically activatable material of the lens is switched from a light passing state to a light inhibiting state such that, in the light inhibiting state, the lens prevents the transmission of visible light from entering into and reflecting out from the one or more vehicle lights to reduce observability of the one or more vehicle lights.

DETAILED DESCRIPTION

Figure 1:
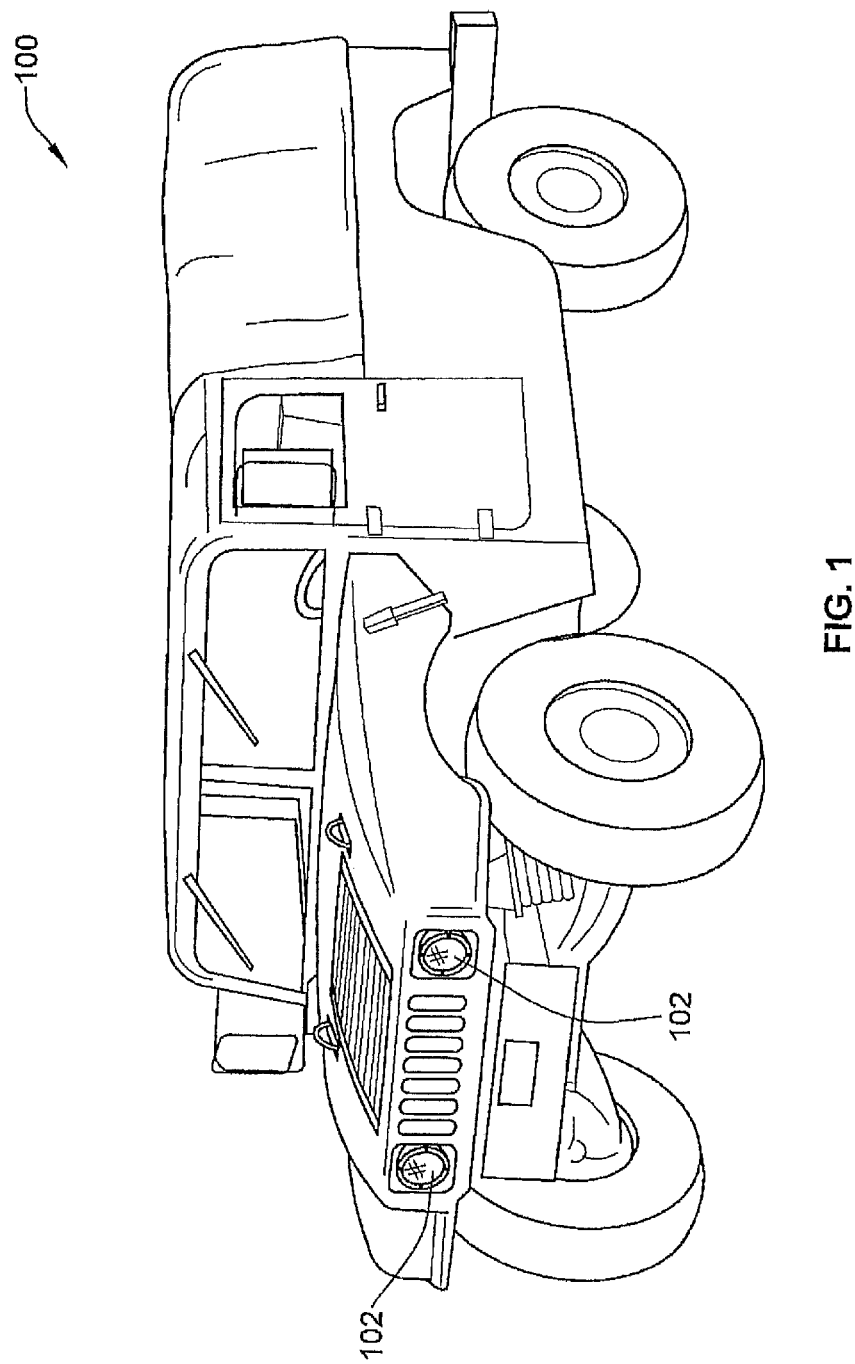
FIG. 1 is a perspective view of a military vehicle with blackout covers positioned over military vehicle lights.

FIG. 1 is a perspective view of a vehicle 100 with blackout covers 102 positioned over vehicle lights. The vehicle 100 may be, for example, a military vehicle such as a High Mobility Multipurpose Wheeled Vehicle (HMMWV, or "Humvee"), or any other vehicle that may be used in conditions in which it is desirable that the vehicle remain undetectable. For example, a Hummvee, or other military transport vehicles, may be used to carry military personnel into areas of battlefield conditions. At night, it is desirable to remain undetectable to any enemy personnel that may be in the area. It may also be desirable for security vehicles, such as vehicles used for special operations, police operations, private security or other security purposes, to be visually undetectable in certain situations. In such situations, for instance, a security or military vehicle may turn its lights off. Currently, military ground vehicles use a light bar composed of several high intensity discharge (HID) and/or infrared (IR) lights in a hardwired configuration permanently attached to the vehicle 100 as well as original equipment manufacturer (OEM) headlights and tail lights. The light assemblies typically include reflective elements, particularly behind the lights to improve illumination. When turned off while approaching battlefield conditions, the lighting assemblies may reflect incident light thereby risking detection by enemy personnel. In the military vehicle 100 in FIG. 1, for example, a driver or passenger may activate the blackout covers 102 to avoid detection due to incident visible light reflections when turning the lights off and reduce the IR signature.

Figure 2:
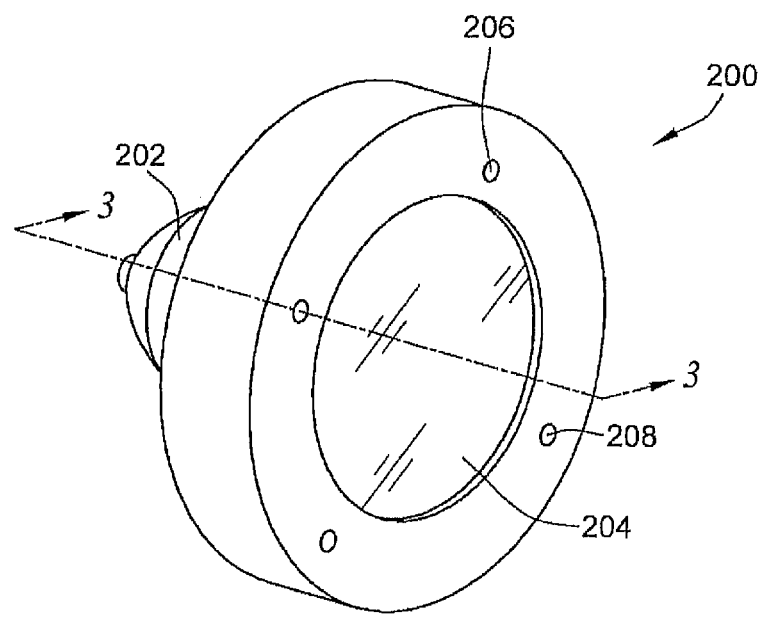
FIG. 2 is a perspective side view of an example of the cover installed over a military vehicle light.

FIG. 2 is a side perspective view of an example of a blackout cover 200 installed over a military vehicle light 202. The blackout cover 200 includes a lens 204 supported by a bezel 206. The blackout cover 200 may be affixed, for example, to the military vehicle light 202 using a set of screws 208. In one example implementation, the blackout cover 200 may be installed over the current light 202 as a kit, replacing the current lens, or it may be added as a cover. As such, the kit may be a retrofit and left in place once installed. The blackout cover 200 may be affixed using clips, or adhesives, or using other fixing devices. The blackout cover 200 may be connected to a switch on an operator panel accessible by a user in the vehicle. The switch may operate the blackout cover 200 independently, or may be connected in parallel with the light 202 for operation in conjunction with the light 202.

Figure 3:
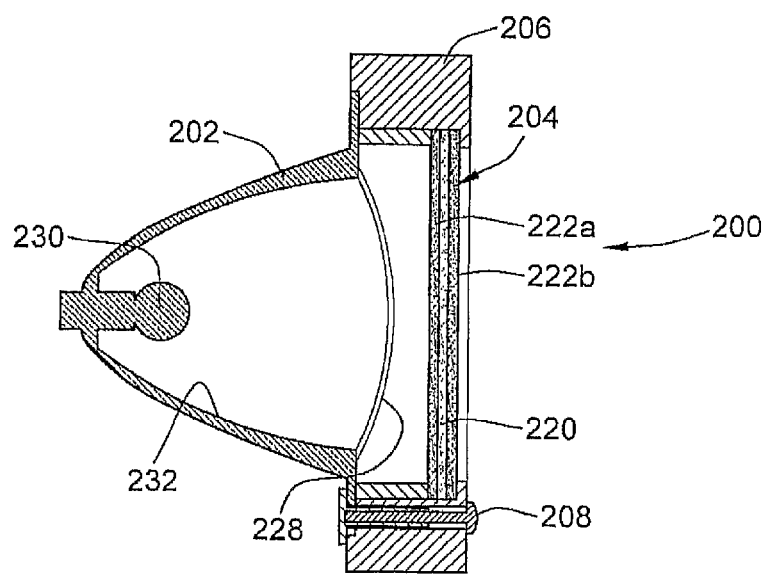
FIG. 3 is a cross-sectional side view at section 2-2 of the cover shown in FIG. 2 illustrating an electrically activatable film disposed between transparent layers of the cover.

FIG. 3 is a side cross-sectional view of section 2-2 of the blackout cover 200 in FIG. 2. In this example, the blackout cover 200 includes an electrically activatable film 220 disposed between transparent layers 222a, b. The blackout cover 200 may be provided as an assembly that includes the bezel 206, the screws 208, the transparent layers 222a,b, and the electrically activatable film 220. The lens 204 may also come pre-fabricated with the electrically activatable film attached to the transparent layers 222a, b of the lens. The blackout cover 200 may then fit over the light 202. The light 202 typically includes a light lens 228, a lighting element 230 and a reflective inner surface 232. In normal operation, the lighting element 230 may be turned 'on' to generate light out through the light lens 228. The reflective surface 232 is configured to reflect any incident light through the light lens 228. Even if the light 202 is turned 'off,' the reflective surface 232 may reflect any incident light that should enter via the light lens 238.

In conditions in which the driver of the vehicle desires to be undetectable, the driver or a passenger may switch an actuator that darkens the blackout cover 200. The blackout cover 200 may then inhibit visible light from passing the electrically activatable film 220 in either direction. Visible light from the lighting element 230 is prevented from passing out of the electrically activatable film 220, or from entering into the light reflective inner surface 232 from outside.

In an example implementation, the electrically activatable film 220 may include an electrochromatic polymer (ECP) film, a material used in liquid crystal displays (LCD), and/or organic materials, such as organic materials that may be used in LCDs. One example type of ECP material activates when a voltage of 1 VDC is applied to the film. An example implementation may alternatively use a simple photocell to drive the system such that when the light 202 is turned on, sufficient voltage may be applied to activate the system and to drive the ECP film to a state that will pass light. When the light is turned off, the system would darken.

As seen, the electrically activatable material may be provided in various constructions, such as a film that can be disposed between transparent layers. Other material constructions may use a vapor deposition process on two adjacent faces of two layers of material and some with additional liquid material in between, for example. Electrical activation may be applied to the two layers, for example, causing migration of certain elements to one layer or the other producing a desired effect. In another example, a suspended particle device (SPD) film may be used with an inverter that produces AC voltage to drive the film. The electrically activatable material may also include phase dispersed liquid crystals (PDLCs), materials known as SageGlass® from Sage Electrochromics, Inc., and electrochromatic materials provided by Chromogenics AB.

In general, the film may determine how the blackout cover 200 is activated. Two scenarios include:
  1. A film that is energized to a light inhibiting state;
  2. A film that is de-energized to a light inhibiting state.

In one example, the film may include multiple layers each having specific functions. For example, the film may include an electrochromopore, an electrolyte layer, and an ion storage layer. In such films, the electrolyte layer is typically a liquid or a gel. In another example, the film may be a rigid or flexible electrochromatic polymer that may be cast from solution on a glass or poly(ethylene terephthalate) ("PET") substrate. The assembly may then be heated under pressure to laminate the structures. The laminated assembly may include optically transparent electrodes, such as for example, indium tin oxide (ITO) layers that may be deposited on the glass or PET substrate and configured for connection to a power supply.

In another implementation, the film may include electrochromic glazing consisting of five thin-film ceramic layers coated directly onto glass. Electrochromic glazing may be implemented similar to low-emissivity glazing used to make energy efficient windows, but in a circuit that enables switching between light transmission or light blocking as desired.

In another implementation, the film may a suspended particles device (SPD), which uses small light-absorbing particles, otherwise known as "light valves." For example, a SPD may be sandwiched between glass or plastic layers and connected via electrical leads to an AC power source. In the 'off' state, the particles are randomly distributed in the SPD and block light incident on the glass or plastic wall from passing through. In the 'on' state, the particles are aligned and allow the incident light to pass through.

In another implementation, a liquid-crystal sheet may be bonded between two layers of glass. The liquid crystal sheet may be connected to a power source. When switched to the 'on' state, the voltage rearranges the liquid-crystal molecules to allow light to pass through the glass. When switched to the 'off' state, the liquid-crystal molecules disperse light making the device opaque.

In some implementations, a selected film may be rigid enough to implement as a single layer precluding the need for other transparent layers 222a,b (in FIG. 3). In other implementations, the film may be laminated on one side of a transparent layer 222a or 222b. In certain embodiments, two or more layers of the film placed adjacent to one another may be used to achieve enhanced light blocking capabilities.

Figure 4:
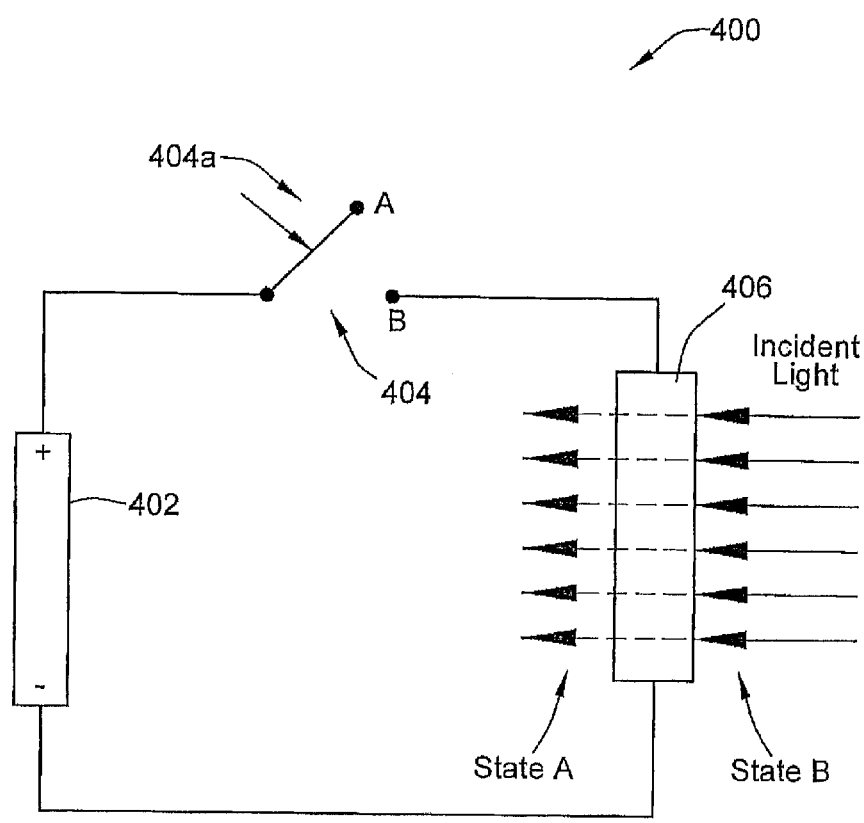
FIG. 4 is a schematic circuit diagram illustrating operation of an example blackout cover.

FIG. 4 is a schematic circuit diagram illustrating operation of an example blackout cover. FIG. 4 shows a circuit 400 that includes a power supply 402 as an electrical power source, an electrical coupling device 404, and a blackout cover 406. The electrical coupling device 404 may be any device adapted to electrically couple the electrically activatable material in the blackout cover 406 to the power supply 402. The electrical coupling device 404 in FIG. 4 is shown as a switch that may be set to one of two states: State A or State B. In State A, the electrical coupling device 404 is open disabling the transfer of power from the power supply 402 to the blackout cover 406. State A is shown in FIG. 4 to allow incident light to pass through the blackout cover 406. State A represents normal operation in the example illustrated by FIG. 4. The vehicle's light may be turned on or off and the blackout cover 406 allows incident light to pass through to reflect off the reflective surface 232 (in FIG. 3). Light generated by the lighting element 230 (in FIG. 3) is also allowed to pass through the blackout cover 406 in the opposite direction. When the electrical coupling device 404 is closed to State B, power is coupled from the power supply 402 to the blackout cover 406 to inhibit incident light (including visible light) from passing through the blackout cover 406. It is noted that the example shown in FIG. 4 assumes that the blackout cover 406 includes a film 220 that inhibits light when electrically energized. That is, the electrically activatable material becomes opaque upon being electrically energized and the electrically activatable material becomes transparent upon being electrically de-energized. The electrically activatable material becomes electrically energized upon reaching a voltage potential threshold such that the lens does not allow the transmission of ambient light into the light reflector 232 from the vehicle light 202.

In an example in which the film 220 inhibits light when electrically de-energized, States A and B would provide the opposite operation as that indicated above. That is, the electrically activatable material becomes opaque upon being electrically de-energized and the electrically activatable material becomes transparent upon being electrically energized. The electrically activatable material becomes electrically de-energized upon removal of a voltage potential threshold such that the lens does not allow the transmission of ambient light into the light reflector 232 from the vehicle light 202.

In another example, the film 220 may be in one state, such as opaque or transparent, with a voltage having a first polarity (for example, +/−) applied to it, and switch to the other state, such as transparent or opaque, when the polarity is switched (for example, to −/+).

The electrical coupling device 404 in FIG. 4 is depicted with an actuator 404a, or actuation device, illustrating alternative ways to change the state of the electrical coupling device 404. For example, the electrical coupling device 404 may be an on/off switch in a control panel accessible by a user in the cabin of the vehicle. The user may manually switch the electrical coupling device 404 from off to on, or vice versa depending on whether the user desires to be detectable. Referring to the example described above, the user may switch the switch 404 from State A (off) to State B (on) to block light and blackout the vehicle.

The switch actuator 404a may also be implemented as a toggle switch, a button, an actuator on a touch panel screen, or a sensor such as a photocell sensor with switch capabilities upon sensing light activity. The actuation device 404a may be any actuator employed to initiate change of operation modes.

In another example, the switch actuator 404a may be the same light switch that operates the vehicle lights. The vehicle lights may be connected to state A such that the blackout cover is enabled when the vehicle lights are turned off. In another example, states A and B may be reversed and the vehicle lights may be connected in parallel to the blackout cover 406.

The switch actuator 404a may be a hardwired switch, a software controlled switch, or a wireless control. For example, the switch actuator 404a may be an electronic switch connected to a controller that controls the blackout cover 406 systematically. For example, a control panel may be configured to place a vehicle in a battlefield condition such that activation of the blackout cover 406 is one function performed to place the vehicle in battlefield condition. In another example, the switch actuator 404a may include a common light switch that is in battlefield mode when switched to one state to both darken the light modules as well as turn the lights off. The electrical coupling device 404 may also be implemented using a wireless connection to a control panel that may or may not be located in the vehicle itself. In alternative arrangements, electrical coupling device 404 may simply be an electrical conductor, such as a cable or copper wiring to electrically couple the electrically activatable material to a power source 402.

The power supply 402 may include the vehicle power supply coupled to the cover 406 via a control panel in the vehicle. The power supply 402 may also include a vehicle battery coupled via a control panel of the vehicle. The power supply 402 may also include an accessory battery coupled via a control panel adapted to re-charge the accessory battery based on conditions of a vehicle battery.

Figure 5:
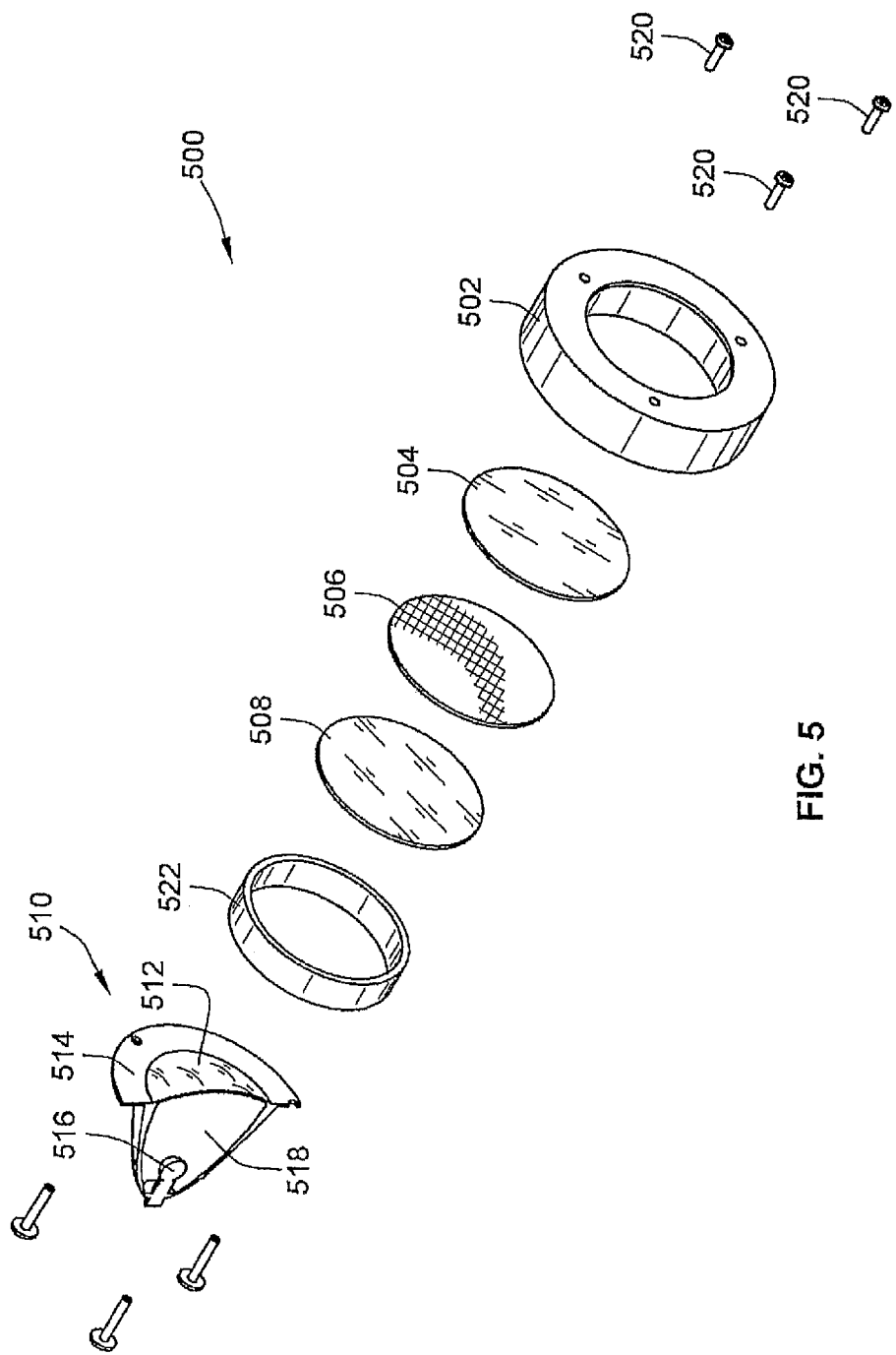
FIG. 5 is an exploded view of the cover and a military vehicle light assembly.

FIG. 5 is an exploded view of a cover and military vehicle light assembly 500. The assembly 500 includes a bezel 502 for supporting the blackout cover assembly, a first transparent layer 504, an electrochromatic layer 506, a second transparent layer 508, and a light assembly 510. The light assembly 510 includes a light lens 512, a support structure 514, a light generating element 516, and a reflective inner surface 518. The electrochromatic layer 506 may be laminated to the transparent layers 504, 508 and fixed to the bezel 502 by a known fixing technique (for example, adhesive, screws, clips, etc.). The transparent layers 506, 508 may made of a glass or polycarbonate material, or of a glass material such as plexiglass or a bullet resistant glass. The blackout cover assembly may then be fixed to the light assembly 510 using screws 520, or any other fixing technique. A spacer 522 may also be provided to create space and an air gap between the lens 204 of the cover and light lens 512 of light assembly 510. In an alternative configuration, the blackout cover assembly 500 may include at least one rim adapted for releasable securement of the blackout cover 600 to the vehicle light. The releasably securable rim, for example, may be formed from a metal, rubber molded or composite material.

Figure 6A:
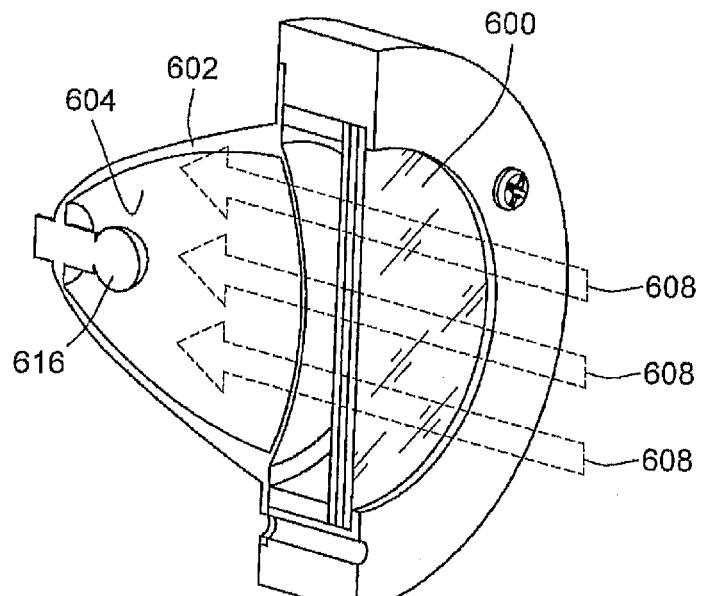
FIG. 6A illustrates one mode of operation of the cover.
Figure 6B:
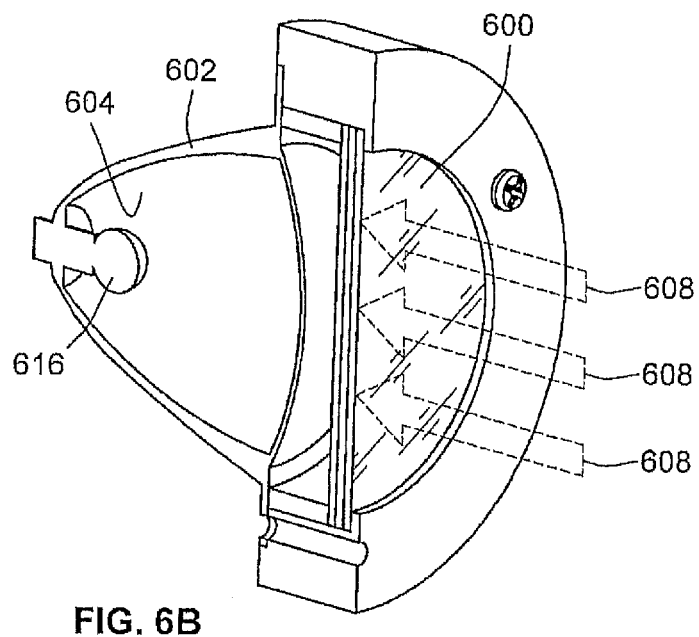
FIG. 6B illustrates another mode of operation of the cover.
Figure 6C:
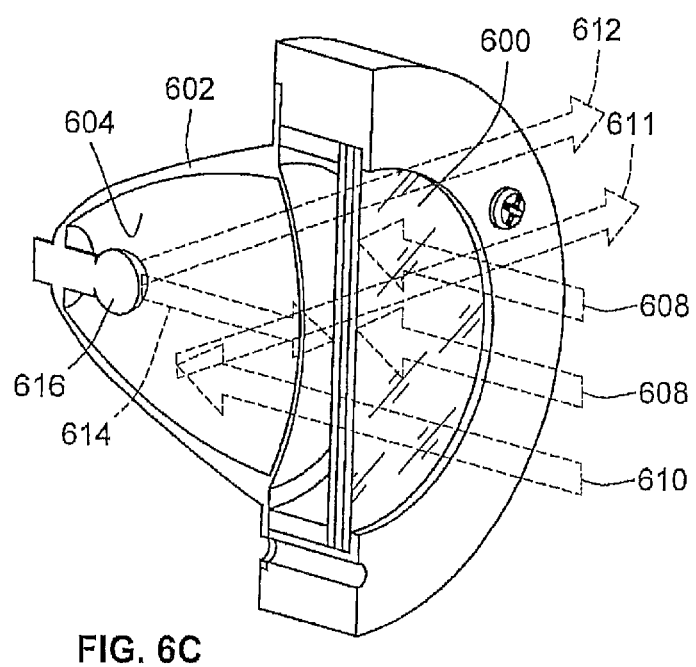
FIG. 6C illustrates a further mode of operation of the cover.

FIGS. 6A-6C schematically illustrate operation of a blackout cover 600 in an example implementation. FIGS. 6A-6C each show a blackout cover 600 mounted on a vehicle light assembly 602. The vehicle light assembly 602 includes a reflective inner surface 604.

FIG. 6A shows the blackout cover 600 in a first state in which the vehicle light 602 operates normally and detection of the vehicle is not a concern. The vehicle light 602 may be 'on' causing light to be generated outward through the blackout cover 600. However, when the light 602 is 'off,' incident light 608 may pass through the blackout cover 600 and reflect off of the reflective inner surface 604 of the light 602. Such reflected light would enable detection of the vehicle even when the light 602 is 'off.' Depending on the material used for the electrochromatic layer of the blackout cover 600, the first state may be enabled by energizing, or de-energizing the blackout cover 600 as described above with reference to FIG. 4. When the blackout cover 600 changes states, the state of a light source 616 may or may not change. For example, the light source 616 may switch off when the blackout cover 600 switches to a blackout state. Or, the light source 616 may be left on even thought the blackout cover 600 has switched to a blackout state.

FIG. 6B shows the blackout cover 600 in a second state in which the vehicle light 602 is in the 'off' state. However, detection of the vehicle is not desired and as shown in FIG. 6B, incident light 608 is blocked by the blackout cover 600 while in the second state. By blocking out the incident light 608, light is inhibited from being reflected off the reflective inner surface 604 of the light 602 diminishing the chance of detection in the dark during battlefield conditions.

FIG. 6C shows an application in which the blackout cover 600 includes an electrochromatic material that selectively allows light having wavelengths in a selected range to pass through while blocking light in other wavelengths ranges. In FIG. 6C, selected incident light 610 in a selected wavelength range is allowed to pass through by the blackout cover 600 and reflect off the reflective inner surface 604 as reflected light 611. Other incident light 608 in another wavelength range is blocked, such as visible light, for example. In the application illustrated by FIG. 6C, the selected wavelength range for the incident light allowed to pass at 610 may be for light in the range from 700 nanometers to a 1200 nanometers. In addition, light generated by the light source 616 may continue to emit if left on after the blackout cover 600 changes states. If the light is left on, infrared light 612 emitting from the light source 616 may pass through the blackout cover 600, but visible light 614 emitting from the light source 616 may be blocked.

The selected wavelength may be in the infrared spectrum, for example. While light that is visible with the naked eye may be blocked at 608, light in the infrared may be allowed to pass. In this manner, a vehicle may be detected by friendly personnel equipped with detectors able to detect the infrared emitted by the vehicle's lights. The visible light emitted by the vehicle's lights would be blocked allowing the vehicle to escape detection by enemy personnel that lack detectors of infrared, such as for example, night vision goggles (NVG).

As seen, a method of utilizing a blackout cover to reduce and eliminate the ability to see vehicle lights resulting from visible light reflecting off the vehicle lights during certain modes of operation is provided. A lens is positioned within a bezel of the cover. The lens has an electrically activatable material such as a layer of electro chromatic film positioned between layers of transparent glass material. The electrically activatable material prevents the transmission of visible light from entering into and reflecting out from the vehicle light when the electrically activatable material is set to the light inhibiting state. In some embodiments, more than one layer of the electrically activatable material may be used to enhance light blocking capabilities. The electrically activatable material is electrically coupled to an electrical power source. The electrically activatable material is able to be switched from a light passing state in which light is permitted to pass through the lens to a light inhibiting state in which the lens prevents the transmission of visible, light from entering into and reflecting out from the vehicle light to reduce observability of the vehicle light.

In one example, the electrically activatable material becomes opaque when electrically energized and becomes transparent when it is de-energized. In alternative arrangements, the electrically activatable material becomes opaque when it is electrically de-energized and becomes transparent when it is electrically energized. The electrically activatable material of the lens may selectively pass light of a particular spectrum (such as infrared light in the 700 nanometer to 1200 nanometer range) through the lens and block out light at wavelengths outside the spectrum. The cover may be adapted for retrofit installation. For instance, the lens may be placed in a bezel that holds the lens in position and the bezel may be releasably or removably secured to the vehicle lights.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A cover for use in connection with one or more vehicle lights, comprising:
 a lens having an electrically activatable material in which the electrically activatable material prevents the transmission of visible light from entering into and reflecting out from the one or more vehicle lights when the electrically activatable material is set to a light inhibiting state;
 a device that holds the lens, the device adapted to be releasably or removably secured over the one or more vehicle lights; and
 wherein the electrically activatable material of the lens is adapted to be set to the light inhibiting state such that the lens prevents the transmission of visible light from entering into and reflecting out from the one or more vehicle lights to reduce the observability of the one or more vehicle lights.

2. The cover of claim 1 wherein the electrically activatable material is an electrochromatic material.

3. The cover of claim 2 wherein the electrochromatic material comprises at least one layer of electrochromatic film.

4. The cover of claim 3 wherein the at least one layer of electrochromatic film is affixed to at least one layer of a transparent material of the lens.

5. The cover of claim 4 wherein the transparent material is a glass or a polycarbonate material.

6. The cover of claim 5 wherein the transparent material is glass material comprising at least one of:
 (a) plexiglass; and
 (b) bullet resistant glass.

7. The cover of claim 3 wherein the electro chromatic film is disposed between layers of transparent material of the lens.

8. The cover of claim 1 wherein the device includes a bezel releasably secured to the one or more vehicle lights by at least one releasably securable rim.

9. The cover of claim 8 wherein the releasably securable rim is formed of a metal, rubber molded material or composite material.

10. The cover of claim 1 wherein the device includes a bezel removably secured over the one or more vehicle lights by screws affixed to a lighting assembly.

11. The cover of claim 1 wherein the vehicle lights are military combat vehicle lights or security vehicle lights.

12. The cover of claim 11 wherein the electrically activatable material is adapted to selectively pass light of a particular spectrum and block out light at wavelengths outside of the spectrum.

13. The cover of claim 12 wherein the electrically activatable material selectively passes light ranging from 700 nanometers to 1200 nanometers.

14. The cover of claim 1 further comprising a coupling device adapted to electrically couple, at least in part, the electrically activatable material to an electrical power source; and
 an actuator that sets the electrically activatable material of the lens to the light inhibiting state in response to user operation.

15. A method of utilizing a cover in connection with one or more vehicle lights comprising:
 releasably securing a device over the one or more vehicle lights, wherein the device holds a lens having an electrically activatable material in which the electrically activatable material prevents the transmission of visible light from entering into and reflecting out from the one or more vehicle lights when the electrically activatable material is set to a light inhibiting state; and
 switching the electrically activatable material of the lens from a light passing state to the light inhibiting state such that, in the light inhibiting state, the lens prevents the transmission of visible light from entering into and reflecting out from the one or more vehicle lights to reduce observability of the one or more vehicle lights.

16. The method of claim 15 wherein the electrically activatable material further comprises at least one layer of electro chromatic film.

17. The method of claim 16 further comprising positioning the at least one layer of electrochromatic film between layers of transparent material of the lens.

18. The method of claim 17 wherein the transparent material is glass material comprising at least one of:
(a) plexiglass; and
(b) bullet resistant glass.

19. The method of claim 15 wherein the vehicle lights are military combat vehicle lights or security vehicle lights.

20. The method of claim 15 further comprising selectively passing light of a particular spectrum through the lens and blocking out light at wavelengths outside the spectrum.

21. The method of claim 20 further comprising selectively passing light ranging from 700 nanometers to 1200 nanometers through the lens.

* * * * *